Patented Aug. 11, 1953

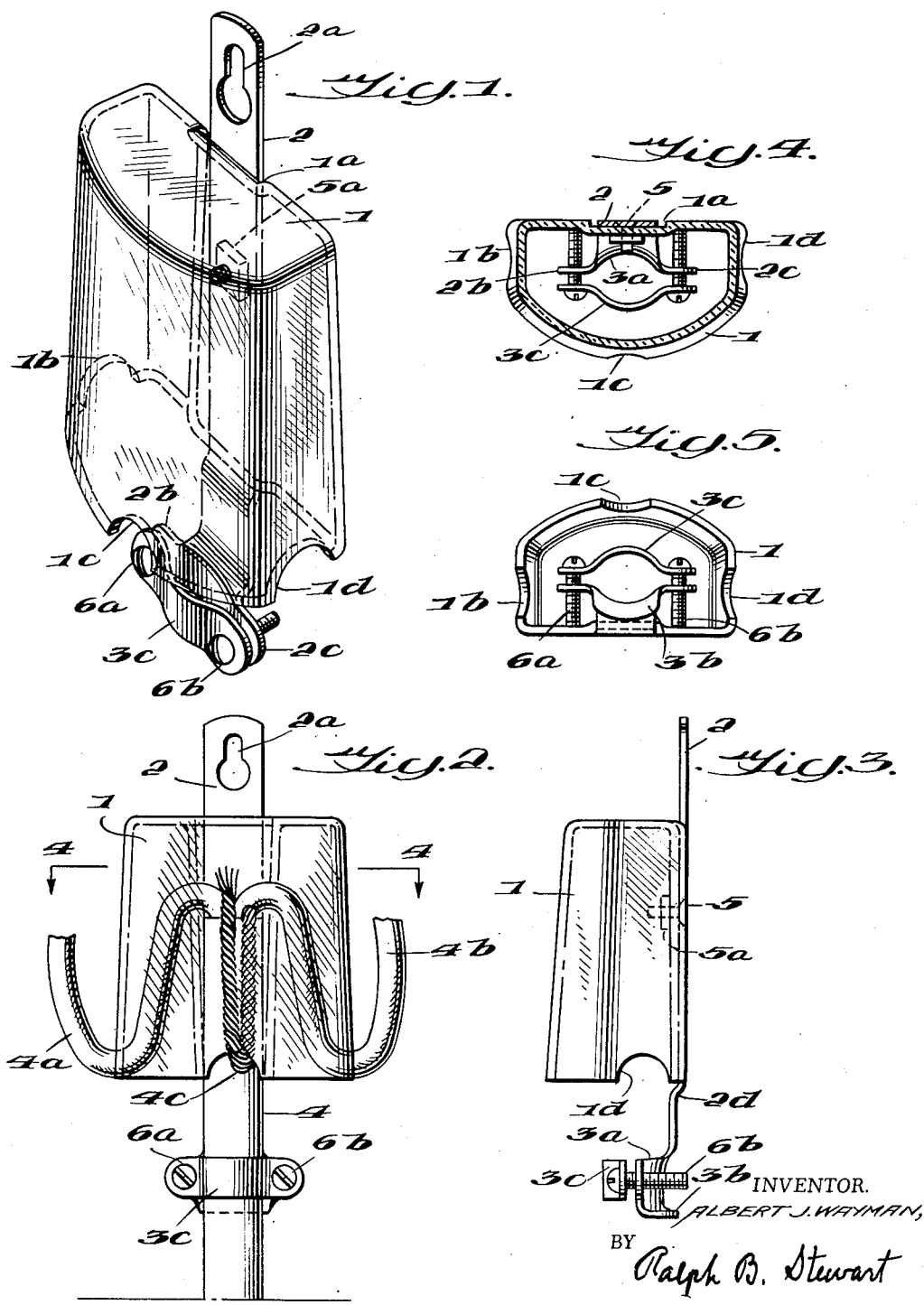

2,648,721

UNITED STATES PATENT OFFICE 2,648,721

SERVICE CABLE ENTRANCE CAP

Albert J. Wayman, East Palestine, Ohio

Application October 10, 1949, Serial No. 120,447

3 Claims. (Cl. 174—82)

This invention relates to service cable entrance caps of the type used when connecting a service entrance cable to outside power lines.

A primary object of the invention is to provide a cap having no openings through which water may leak.

Another object is to provide a cap having a minimum number of parts and which is extremely simple to install.

Still another object is to provide a cap the installation of which automatically results in the formation of drip loops in the cable leads.

Yet another object is to provide a cap in which the possibility of a short-circuit occurring is practically eliminated.

A further object is to provide a cap wherein the entire installation may be easily inspected.

A preferred form of the invention is shown in the accompanying drawing in which

Figure 1 is a perspective view of the improved cap shown on a somewhat enlarged scale with respect to the other figures;

Figure 2 is a front elevational view of the cap with the cable installed therein;

Figure 3 is a side elevational view of the cap;

Figure 4 is a sectional view of the cap taken along 4—4 of Figure 2; and

Figure 5 is a view taken from the bottom of the cap.

Referring to the drawing, the cap 1 is shown mounted on a mounting bracket 2 which supports a cable clamp at its lower end. The cap is generally of an inverted cup shape and has a wide, shallow groove 1a formed vertically in the rear face thereof to receive the mounting bracket 2. In the preferred form illustrated the cap has a flat rear face, two narrow, flat sides at right angles thereto, and a curved front face. Spaced around the lower edge of the cap 1 at points at which the cable leads are to be brought out are notches 1b, 1c and 1d. As shown, the notches 1b and 1d are formed in the lower edges of two narrow side walls while the notch 1c is formed at the center of the lower edge of the front wall of the cap. Preferably, the cap is formed as by molding in one piece of an insulating material, preferably of a transparent plastic such as polystyrene. However, it may be formed of porcelain or any other suitable insulating material.

The mounting bracket is preferably formed of a sheet metal member of inverted T-shape having its vertical shank portion 2 arranged in groove 1a and having a keyhole-shaped aperture 2a near the upper end of shank 2 to receive a mounting screw. The lower end of the bracket constituting the head of the T-shaped member is formed of two ears 2b and 2c extending laterally from the lower end of shank 2, and these ears, together with the bowed portion of the bracket between them, form one half 3a of the cable clamp. The extreme lower edge of the bracket is turned back to form a lip 3b which prevents chafing of the cable 4. Just above the clamp portion the strap or shank 2 is off-set at 2d to allow the clamp portion to stand clear of the wall upon which the bracket is mounted and to position the clamp directly beneath cap 1.

The cap 1 is mounted on the bracket shank 2 between the aperture 2a and the off-set 2d by means of a suitable fastening device such as machine screw 5 and a clamping nut 5a with the bracket resting in the slot 1a as previously mentioned. A bowed clamping strap 3c is attached to the bracket by means of machine screws 6a and 6b which are threaded into the ears 2b and 2c.

Before inserting the cable 4 into the cap 1, the leads 4a and 4b are separated and the ground wire strands are twisted together to form a third lead 4c. These leads are then bent back along the main part of the cable 4 and the cable is inserted into the cap 1 until the end is well up within the cap and then fastened by tightening clamp 3. The leads are then placed in the notches 1b, 1c and 1d and bent upward, thus forming drip loops therein and positioning them for attachment to the power lines. The cable 4 is connected to the meter in the usual way.

It will be seen that a service entrance cable cap made according to my invention is easily and cheaply manufactured as well as easily installed. My invention avoids the use of heavy cast metal parts; all the metal parts, except the conventional screws and nuts, being formed from relatively thin sheet metal by the usual stamping and forming operations. It is completely weatherproof and, when cap 1 is formed of a clear plastic material, allows easy and instant inspection of the installation.

What I claim is:

1. A service entrance cable cap comprising an inverted cup-shaped member formed of insulating material and having a flat rear face, a mounting strap of uniform width and thickness arranged in face-to-face contact with the rear face of said cup-shaped member and extending above and below said cup-shaped member, said strap having an aperture formed therein near the upper end thereof above said cup member, means including a clamping screw for securing the rear wall of said cup-shaped member to said strap, a forwardly projecting off-set formed in said strap below the lower edge of said cup-shaped member, two transversely disposed ears formed on the off-set portion of said strap below said cup member, said ears and the lower end of said strap forming one-half of a cable clamp, and a clamping member mounted transversely of said mounting strap by two screws passing through said clamping member and threaded into said ears.

2. A service entrance cable cap comprising an inverted cup-shaped member formed of insulating material and having a flat rear face with a relatively wide and shallow groove formed vertically therein, a mounting strap of uniform width and thickness arranged within said groove and extending above and below said cup-shaped member, said strap having an aperture formed therein near the upper end thereof above said cup member, means including a clamping screw for securing the rear wall of said cup-shaped member to said strap, a forwardly projecting off-set formed in said strap below the lower edge of said cup-shaped member, two transversely disposed ears formed on the off-set portion of said strap below said cup member, said ears and the lower end of said strap forming one-half of a cable clamp, and a clamping member mounted transversely of said mounting strap by two screws passing through said clamping member and threaded into said ears.

3. A service entrance cable cap comprising an inverted cup-shaped member formed of insulating material and having a flat rear face provided with a relatively wide and shallow groove formed vertically therein, a mounting bracket for said cup member formed of sheet metal of uniform thickness and comprising an inverted T-shaped member having its vertical shank portion positioned within said groove and extending above and below the said cup member, the upper end of said shank portion having formed therein an aperture for a mounting screw, said shank portion being off-set below said cup member in a direction so that the off-set portion is positioned beneath the open end of said cup member, means including a clamping screw for securing the rear wall of said cup-shaped member to the shank portion of said bracket at a point between said aperture and said off-set portion, the back insulating wall of said cup member having face-to-face contact with said shank portion from said off-set portion to said apertured portion, the head portion of said inverted T-shaped member being formed of two horizontally extending ears formed on opposite sides of the off-set part of said shank portion adjacent the lower end thereof, said ears and the lower end of said shank forming one half of a cable clamp, and a clamping member mounted transversely of the off-set portion of said shank by two screws passing through said clamping member and threaded into said ears.

ALBERT J. WAYMAN.

References Cited in the file of this patent

UNITED STATES PATENTS

| Number | Name | Date |
|---|---|---|
| 969,816 | Wallau et al. | Sept. 13, 1910 |
| 975,757 | Fleury | Nov. 15, 1910 |
| 1,888,645 | Vibber | Nov. 22, 1932 |
| 2,139,742 | Fralick | Dec. 13, 1938 |
| 2,178,092 | Werner | Oct. 31, 1939 |
| 2,292,818 | Bissell | Aug. 11, 1942 |
| 2,374,622 | Rugg | Apr. 24, 1945 |
| 2,423,350 | Stockton | July 1, 1947 |
| 2,431,999 | Engelhardt | Dec. 2, 1947 |